Patented Mar. 24, 1942

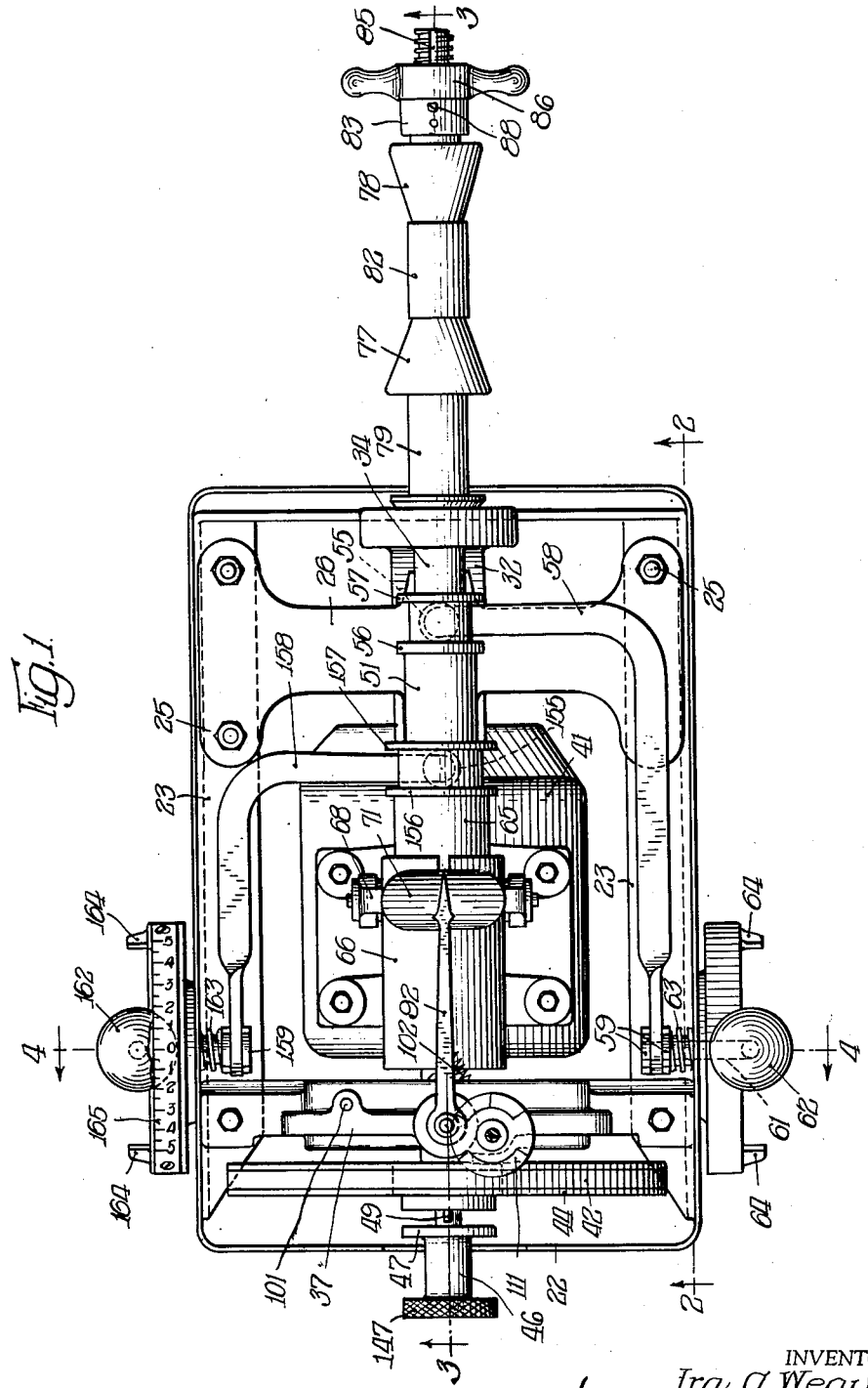

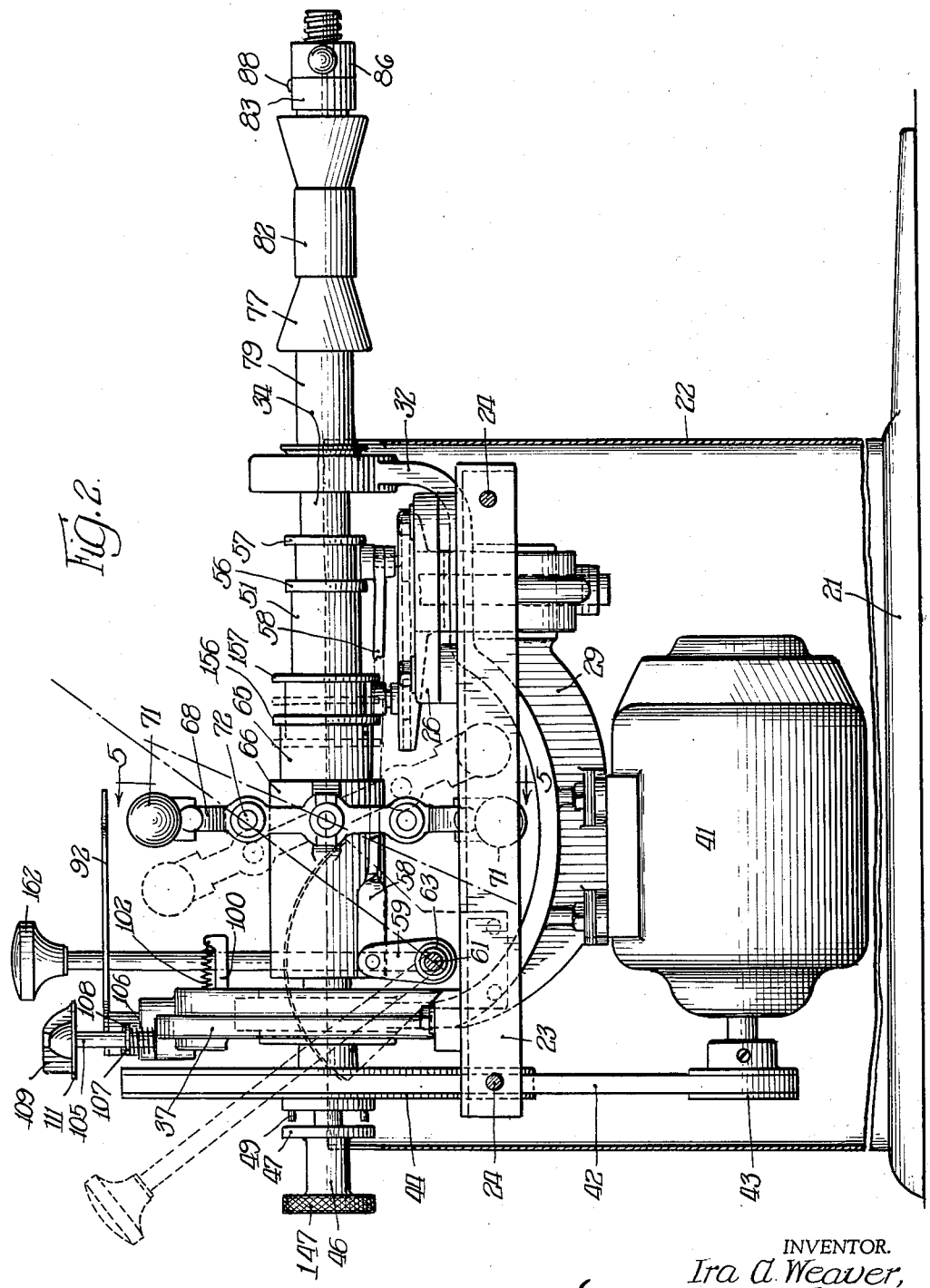

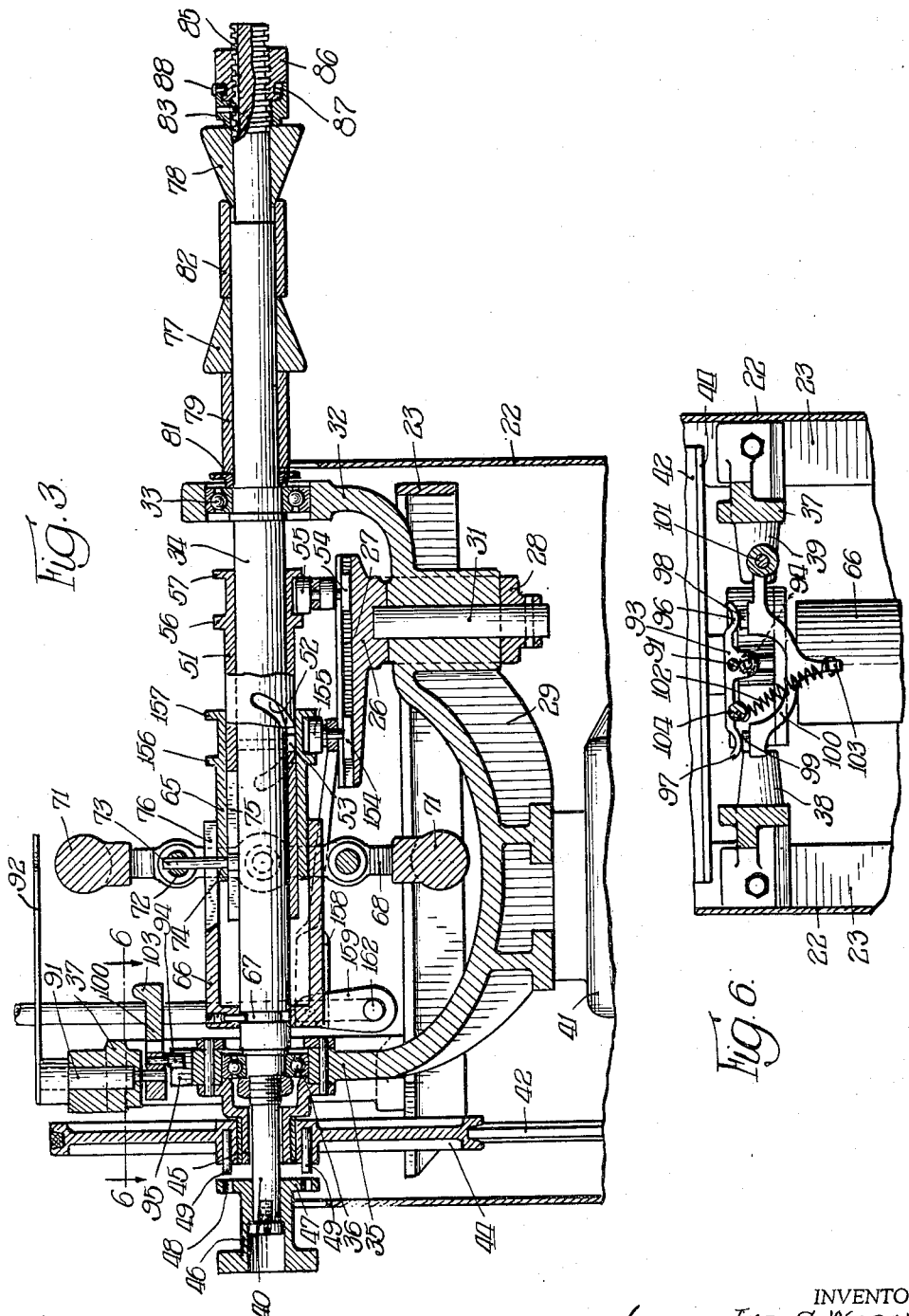

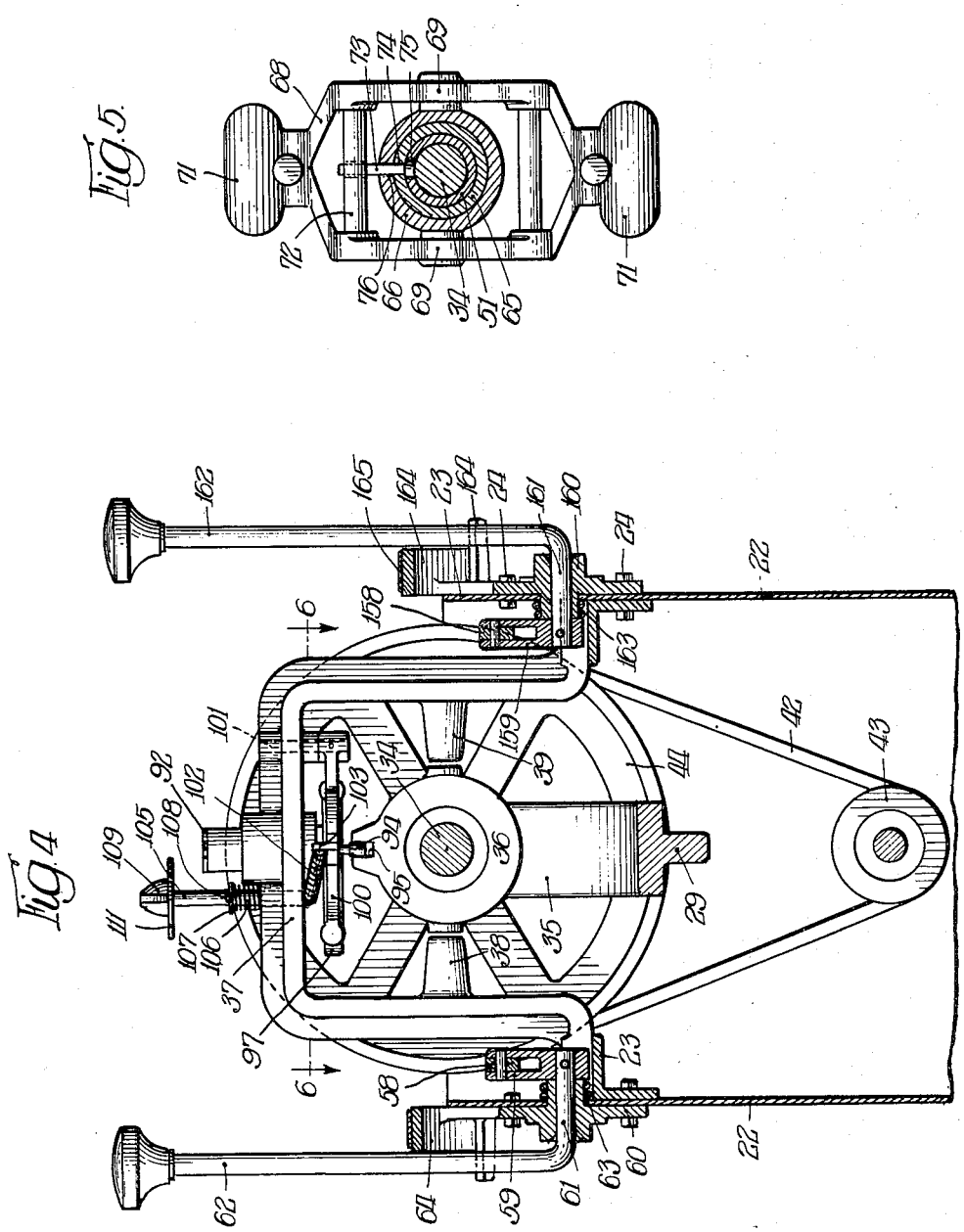

2,277,190

UNITED STATES PATENT OFFICE 2,277,190

WHEEL-BALANCING MACHINE

Ira A. Weaver, Springfield, Ill., assignor to Weaver Manufacturing Company, Springfield, Ill., a corporation of Illinois Application July 28, 1939, Serial No. 287,128

6 Claims. (Cl. 73—53)

The present invention relates to appliances for securing the balancing of automobile wheels or the like, and it concerns more particularly, devices of the character which will indicate the presence or absence of an unbalanced condition of the wheel, or its equivalent, while such wheel or other body is undergoing rapid rotation.

It some times happens that the wheel may be found to be correctly statically, and yet not dynamically, balanced when rotating at substantial speed, so that such a wheel on an automobile will cause steering difficulties and alignment troubles when the car is traveling at any material speed.

Accordingly, a primary purpose of the invention is to provide an apparatus whereby the presence of such dynamic balance in a wheel may be easily brought about even by a person not particularly skilled in such art.

The new and improved apparatus also serves in the balancing of a wheel statically, and it indicates the point where the maximum or minimum weight causing the unbalance is located.

A further object of the invention is to supply such a balancing-machine in which the wheel-support may be power-rotated at a suitable speed and which incorporates also appropriate indicating means to determine the degree of, and the position of, the unbalancing weight in the wheel.

The new appliance has weight-means for balancing an unbalanced wheel and from a determination of the position and amount of such weight-means necessary to effect such balance, the proper application of a weight or weights to the wheel permanently can be ascertained and performed.

Viewed in another way, a purpose of the invention is to provide a mechanism capable of adjustment to supply a dynamic balance or a dynamic unbalance of graduated degree so that the unbalance of the machine can be used to counterpoise the unbalance of the wheel undergoing test and the unequalized means in the machine to produce such equilibrium indicates what must be done to the wheel itself to render it in proper operating balance.

An added aim of the invention is to supply an appliance of this type or character which is relatively simple in structure, which is easily operable, which is reliable in its action, and which is unlikely to become damaged or injured in ordinary service, even though used by relatively inexperienced persons.

To enable those acquainted with this art to understand the present invention both from structural and functional standpoints, a present preferred embodiment of the invention has been illustrated in detail in the accompanying drawings forming a part of this specification and to which reference should be had in connection with the following detailed description and in these drawings throughout the several views like reference numerals have been employed to designate the same structural parts.

In these drawings—

Figure 1 is a plan view of the novel balancing-machine with the top cover removed;

Figure 2 is a fragmentary, vertical, longitudinal section on line 2—2 of Figure 1;

Figure 3 is a fractional vertical section on line 3—3 of Figure 1;

Figure 4 is a partial, transverse section on line 4—4 of Figure 1;

Figure 5 is a cross-section on line 5—5 of Figure 2; and

Figure 6 is a detail, horizontal section on line 6—6 of Figure 4.

Referring to these drawings, it will be observed that a base-casting 21 (Figure 2), resting on the floor, supports an upright, rectangular casing or housing 22 (Figures 1, 2 and 3) having in the upper portion of its interior a horizontal frame 23 bolted at 24 to the opposite walls of the casing, and, by means of bolts 25, a casting 26 is mounted on one end portion of such frame 23.

On its upper surface member 26 has an undercut, centrally-disposed, guiding-groove 27 (Figure 3) disposed longitudinally of the appliance, and, on its under side, such element 26 has a depressed part 28 providing a transverse opening through which extends a yoke 29 oscillatory in a horizontal plane around a vertical-bearing 31.

One upstanding end portion 32 of yoke 29 supports a bearing 33 for a horizontal shaft 34, the opposite upright end 35 of such yoke having another bearing 36 for the same shaft.

Around such bearing 36 is an inverted yoke 37 fixedly mounted on the frame 23 and equipped with a pair of opposed abutments 38 and 39 (Figure 4) on opposite sides of the arm 35 and normally spaced a slight distance therefrom to permit a limited horizontal oscillation or rocking of the yoke 29 and its shaft 34 around the axis of bearing 31.

Fixedly mounted on the under side of, and therefore rockable horizontally with, yoke 29 is an electric-motor 41 (Figure 2) operatively connected to shaft 34 by means of a belt 42 passing around a grooved pulley 43 on the motor-shaft and around another, companion, grooved pulley 44 (Figure 3) revoluble on a hollow, stationary bearing 45 through which a reduced-diameter portion 40 of shaft 34 extends.

Keyed on the adjacent end part of shaft 34, so as to be capable of sliding thereon, is a clutch-sleeve 46 having a knurled periphery 47 by which it may be manually actuated and having at its opposite end an apertured flange 47 with a circular series of holes 48 therethrough adapted, in the inner position of the sleeve 46, to receive two driving-pins 49, 49 outstanding from the hub of pulley 44, so that, when the clutch-sleeve is in its inner position, the electric-motor is operatively coupled to the shaft, and when the sleeve is in its withdrawn or outer position, such connection is broken, all as will be readily understood, allowing the shaft 34 to turn free from its driving-connection.

It should be noted that, by reason of the specified rotary mounting of the pulley 44 on the yoke 29 rather than on the shaft 34, the strain imposed by the belt 42 on the pulley is not transmitted to the shaft.

Slidable and also oscillatory on shaft 34 is an inner sleeve 51 (Figure 3) having a spiral-groove 52 therethrough in which fits a pin 53 fixed to, and outstanding from, shaft 34, whereby when the sleeve is slid lengthwise on the shaft the sleeve will be turned a possible 180° relative to the shaft.

To bring about such sliding or reciprocation of the inner sleeve 51, a rectangular block 54 (Figure 3) is slidable in the larger lower portion of the undercut-groove 27, and such block carries an anti-friction roller 55 occupying the space between two circular ribs 56, 57 on the sleeve, this block being connected by a right-angle link 58 to a bifurcated arm 59 on the inner end of a short shaft 61 occupying a bearing in a casting 60 secured to the housing 22, such shaft being fitted outside of the casing with an upstanding operating handle 62, a friction coiled-spring 63 pressing against the arm 59 and at its other end against the inner face of the housing thereby preventing unintentional turning of such handle, which may be manually swung in an arc between fixed limiting-stops 64, 64.

Slidable on such inner sleeve is an intermediate sleeve 65 adapted to be slid back and forth on the inner sleeve by elements 154, 155, 156, 157, 158, 159, 160, 161, 162, 163 and 164 much like the mechanical elements 54 to 64 inclusive, but, in this case, the casting 160 associated with the handle 162 has a curved scale 165 (Figure 1) graduated numerically in opposite directions from a center 0, and, when the handle 162 is opposite such 0, it stands exactly vertically.

Thus, by shifting handle 162 in one direction or the other, the second sleeve 65 is slid in the corresponding direction, all as will be readily understood, the extent of turning of the handle being indicated by its relation to the scale 165.

An outer sleeve 66 is mounted on shaft 34 and it also surrounds a portion of sleeve 65, such sleeve 66 being secured at 67, by a pin and circular-groove connection, against longitudinal travel on shaft 34 but permitting rotary turning of the sleeve on such shaft.

The external sleeve 66 is straddled by a double or skeleton arm 68 pivoted or hinged at its middle point to opposite sides of the sleeve at 69 in register with the axis of the shaft 34, such arm at its opposite ends carrying two equal weights 71, 71 at equal distances from the axis of the shaft.

Arm 68 has bearings for a short cross-shaft 72 extended across the opening in the arm which, as shown in Figure 5, accommodates the main-shaft 34 and its three associated, interfitting or telescoping sleeves, such rock-shaft 72 having an outstanding rod 73 fixed therein, the latter extending through and being held firmly in a hole 74 through the sleeve 65, the rod occupying a longitudinal slot 75 in the innermost sleeve 51 and a similar lengthwise slot 76 through the outermost sleeve 66.

From what precedes, it will be apparent that, when the handle 62 is shifted forwardly or rearwardly, the pair of weights 71, 71 will be turned angularly concurrently around the common axis of the shaft 34 and its several sleeves.

Also, when the handle 162 is swung forwardly or rearwardly from its central or neutral zero position, the rock-arm 68 will be shifted longitudinally of the shaft 34 carrying the one weight 71 in one direction and the companion weight 71 in the opposite direction, these two weights being thus adjusted simultaneously and equally.

At its front end, shaft 34 is fitted with a pair of oppositely-facing cone-collars 77, 78, a sleeve 79 adapted to bear against a shoulder 81 of the shaft, a spacer 82 between the cones, a sliding-collar 83 having an inwardly-projecting pin occupying a lengthwise groove 85 in the reduced-diameter threaded end-section of the shaft, and an adjustable winged-nut 86 having a circular-groove 87 receiving the inner end of a screw 88 in the collar 83.

By these cooperating instrumentalities, as will be readily understood, the tire-equipped automobile-wheel, or other body to be tested, can be quickly and accurately mounted on the shaft by means of the cones and securing means for the testing of its balance and the correction of its unbalance if such exists, as frequently happens.

The top, horizontal cross-bar of the inverted yoke 37 has a vertical-bearing therethrough for a short, upright shaft 91 (Figure 3) having a pointer or index 92 of substantial length mounted on its upper end, its lower end carrying a casting 93 (Fig. 6) having a downwardly-projecting anti-friction roller 94 (Fig. 3) occupying a groove 95 in the top of bearing 36 and disposed above, and longitudinally centrally of, shaft 34.

Casting 93 also has two oppositely-arranged arms 96 and 97 (Fig. 6) against the side faces of which bear portions 98 and 99 of a horizontal, curved arm 100 fulcrumed in the top wall of the yoke at 101, the arm 100 being yieldingly pulled toward the companion arms 96 and 97 by a coiled-spring 102 connected at one end to arm 100 at the point 103 and joined at its other end to an eccentrically-mounted screw 104 on the lower end of a vertical shaft 105 having a bearing in the top wall of the inverted yoke, such shaft being held frictionally in any position of angular adjustment by a coiled-spring 106 surrounding the shaft and bearing at its bottom end on the yoke-member 37 and pressing at its upper end against the collar or washer 107 held in place on the shaft by a cotter-pin 108.

The upper end of the spring-adjusting shaft 105 carries a combined handle and pointer 109 by means of which the shaft may be turned to secure varying degrees of sensitivity of the appliance, the pointer or index of such handle or knob cooperating with an accompanying, stationary, gauge-plate 111 mounted fixedly on the top enclosing casing or cover, not shown, and the several legends "commercial," "sensitive," "supersensitive," "set here to level" and "with no wheel shim base until hand remains in center of travel" are present on such plate and indicate the several functions performed by the spring adjusted in various ways or with the spring action temporarily eliminated.

The novel and improved balancing-appliance is operated substantially as follows, assuming that an automobile-wheel fitted with its tire is to undergo test as to its balance.

The outer cone 78, collar or sleeve 83, and accompanying hand-operated nut 86 having been removed, the wheel to be examined is placed on the shaft and the previously-removed elements replaced and tightened to properly mount the wheel on the mating cones, it being understood that during rotation of the shaft any tendency of the wheel to loosen the nut 86 is eliminated by reason of the intervening sleeve or collar 83 which cannot turn on the shaft but may slide thereon.

With the clutch released, thus disconnecting the electric-motor from the relatively-long shaft, the latter and its associated elements are free to turn, allowing the wheel being subjected to test to be first balanced statically in the usual and well understood manner.

Such initial or preliminary static balance of the wheel having been effected, its test for dynamic balance is now in order.

With both handles 62 and 162 in their vertical or neutral positions, thus assuring that the two weights 71, 71 are in the same cross-plane at right-angles to the axis of the shaft, the motor is clutched to the shaft and the electric-current turned on causing the shaft and wheel to revolve more or less rapidly.

If the wheel is out of operating-balance, which is most likely, even though it is in static balance, the absence of dynamic balance will cause a horizontal oscillation of the shaft and associated parts which will be indicated in magnified degree by the vibration of the pointer 92 by reason of its substantial length. Thereupon, the operator shifts the handle 162 a small amount first in one direction from the central 0 and then in the opposite direction and one of such movements will have some effect in reducing the vibration of the pointer and the parts which operate it.

This informs the operator in which direction handle 162 is to be turned to bring about the complete balancing of the wheel.

Then, the operator slowly rocks handle 62 in one direction or the other as occasion requires to bring the now unbalanced offset weights into the proper angular plane coincident with the weights of the wheel which produce its unbalance, and, when such plane has been thus ascertained by manipulation of handle 62, handle 162 is again adjusted more or less to vary or modify the unbalancing of the two weights 71, 71 until their unbalance balances the unbalance of the wheel itself, such result, of course, being indicated by the fact that the pointer then remains stationary because there is no unbalance in the system as a whole to rock or vibrate the pointer.

It will be recognized that when the pair of weights 71, 71 are in the same plane transverse to the axis of the shaft, they balance one another, and the further they are shifted coincidentally and in like degree in opposite directions, the more they are unbalanced and it is this absence of counterpoise which is employed to counteract the unbalance in the wheel.

In Figure 2 of the drawings, the pair of weights 71, 71 and their connected operating-handle 162 have been illustrated in full lines in their normal or neutral balanced positions, their extremes of movements being indicated by dotted lines.

Assuming that the automobile-wheel undergoing examination has been dynamically balanced by the specified adjustments of the test-weights 71, 71, it then becomes necessary to actually balance the wheel itself by its own weight.

One of the weights 71 will be in an inclined position toward the wheel and the other weight will be away from the wheel.

This indicates that to the side of the wheel opposite the first weight there should be attached a weight in amount equal to that shown by the position of the handle on the scale and to the other side of the wheel and in register with the other weight 71, a like weight should be fixedly applied to the wheel.

Such weights for application to the wheel can conveniently be of lead fitted with spring-clips for the rim of the wheel.

After the wheel has been thus balanced dynamically it is ordinarily well to recheck its static balance.

It may be noted that the anti-friction rollers 55 and 155 which slide the sleeves lengthwise during the weight-adjusting operations are mounted directly under and in line with the main-shaft, so that any oscillation of the latter does not materially affect the movements of the sleeves.

Any unbalanced condition of the shaft-assembly including the wheel is clearly evidenced to the operator by vibration or oscillation of the pointer, and, when the parts become balanced by the test-weights, the pointer remains stationary, due to the fact that the shaft does not oscillate horizontally because the couple set up by the inclined disposition of the test-weights counterbalances the objectionable couple in the wheel.

In the case of disc-wheels, instead of using the supporting cones, a structure like that, or the equivalent of that, shown in Figures 5 to 8 inclusive of my earlier Patent 1,977,297, Wheel-testing appliance, granted October 16, 1934, may be employed.

I claim:

1. In a dynamic body-balancing appliance having a main-support, a member having a vertical-bearing on said support and capable of rocking in a horizontal plane about the axis of said bearing, a rotary shaft, bearing-means on said member accommodating said shaft, means to mount the body to be balanced fixedly on said shaft to rotate therewith, and means to rotate said shaft and body, the novel features of a first sleeve, means mounting said first sleeve on said shaft to turn around the axis of said shaft but against longitudinal movement on said shaft, a rock-arm pivoted on said sleeve and extending radially in opposite directions from the axis of said shaft, a pair of equal weights mounted on said rock-arm 180° apart and equal distances from the axis of said shaft, the axis of said pivot of said rock-arm being at right-angles to, and extending through, the axis of said shaft, a second sleeve on said shaft having a spiral-slot and pin connection with said shaft, means to slide said second sleeve manually longitudinally on said shaft to cause angular turning of said second sleeve around the axis of said shaft, a third sleeve on, rotatable with, and slidable longitudinally on, said shaft, means to adjust said third sleeve manually lengthwise on said shaft, and means connecting said three sleeves to said rock-arm, whereby manual adjustment of said second sleeve lengthwise of said shaft causes angular turning of said first, second and third sleeves and said rock-arm and weights about the axis of said shaft, and manual adjustment of said third sleeve lengthwise of said shaft effects rocking of said weights simultaneously and equally in opposite directions lengthwise of said shaft.

2. The dynamic body-balancing appliance set forth in claim 1 in which said three sleeves are in telescopic relation with one another, said first sleeve being the outermost, said second sleeve the innermost, and said third sleeve intermediate the other two sleeves.

3. The dynamic body-balancing appliance set forth in claim 1 in which said means to rotate said shaft is mounted on said member, and in which said balancing appliance includes additionally the novel features of means to maintain said member and shaft yieldingly in neutral-position and means to limit the horizontal rocking of said member and shaft in opposite directions from said neutral-position.

4. The dynamic body-balancing appliance set forth in claim 1 in which said three sleeves are in telescopic relation with one another, said first sleeve being the outermost, said second sleeve the innermost, and said third sleeve intermediate the other two sleeves, and in which said means to rotate said shaft is mounted on said member and in which said balancing appliance includes additionally the novel features of means to maintain said member and shaft yieldingly in neutral-position and means to limit the horizontal rocking of said member and shaft in opposite directions from said neutral-position.

5. In a dynamic balancing-appliance having a revoluble shaft, a member having bearing-means in which said shaft is adapted to rotate, means to rotate said shaft, means to mount the body to be balanced fixedly on said shaft to revolve therewith, a suitably-supported vertical-bearing for said member around the axis of which said member, shaft and body may rock in a horizontal plane, the axes of said shaft and vertical-bearing intersecting, a pair of equal weights mounted on and rotatable with said shaft, means to adjust said pair of weights angularly around the axis of and during the rotation of said shaft, and means to vary the weight-effect of said pair of weights on said body, whereby said body may be balanced by said pair of weights, including the novel features of means mounting said weights on said shaft 180° apart and adapted to permit tilting of said weights simultaneously in opposite directions longitudinally of said shaft from a plane at right-angles to the axis of the shaft in which said weights are opposite, and balance, one another, in combination with means for thus tilting said weights during rotation of the shaft, and in which said means to adjust said pair of weights angularly around the axis of said shaft includes the novel features of a first circumferentially-grooved sleeve slidable lengthwise on the shaft and a roller movable in the plane of the axes of said shaft and vertical-bearing and occupying said groove, and in which said means for tilting said weights in opposite directions longitudinally of said shaft includes the novel features of a second circumferentially-grooved sleeve slidable lengthwise on said shaft and a second roller movable in the plane of the axes of said shaft and vertical-bearing and occupying the groove of said second sleeve.

6. In a dynamic balancing-appliance having a member, a mounting for said member permitting the latter to rock horizontally only around a fixed vertical axis, horizontal bearing-means on said member with the axis thereof intersecting said vertical axis, a shaft revoluble in said bearing-means, means on said member to rotate said shaft, means to fixedly mount the body to be balanced on said shaft to revolve therewith, a pair of equal weights, means mounting said weights on said shaft 180° apart, equidistant from the axis of the shaft and in a manner to permit shifting of the weights simultaneously and equally in opposite directions longitudinally of the shaft from a plane at right-angles to the axis of the shaft in which the weights are opposite, and balance, one another, means to normally yieldingly hold said shaft, body and weights in a neutral position, the novel combination of features being that said shifting of said pair of weights is a tilting thereof relative to said plane, in combination with manually-operable means to so shift said weights during rotation of the shaft, body and weights, manually-operable means to adjust said pair of weights angularly around the axis of said shaft during rotation of said shaft, body and weights, whereby the dynamic unbalance of said body undergoing test may be balanced by said pair of weights, said body-mounting means being on one side of said vertical axis and said pair of weights being on the opposite side of said vertical axis.

IRA A. WEAVER.